United States Patent
Maeda et al.

(10) Patent No.: US 8,915,410 B2
(45) Date of Patent: Dec. 23, 2014

(54) ROTARY SUPPORT APPARATUS

(75) Inventors: Kenji Maeda, Osaka (JP); Tomotaka Takeuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/525,365

(22) Filed: Jun. 18, 2012

(65) Prior Publication Data

US 2012/0318836 A1    Dec. 20, 2012

(30) Foreign Application Priority Data

Jun. 20, 2011 (JP) ................. 2011-135943
May 18, 2012 (JP) ................. 2012-115075

(51) Int. Cl.
  *B60R 7/00*         (2006.01)
  *H01H 47/00*        (2006.01)
  *H02B 1/24*         (2006.01)
  *B60R 11/02*        (2006.01)
  *B64D 11/00*        (2006.01)
  *B60R 11/00*        (2006.01)

(52) U.S. Cl.
  CPC ........ *B60R 11/0235* (2013.01); *B64D 11/0015* (2013.01); *B60R 2011/0028* (2013.01); *B60R 2011/0085* (2013.01); *B60R 2011/0092* (2013.01)
  USPC ............................ 224/311; 307/130; 307/112

(58) Field of Classification Search
  USPC ......... 224/311; 348/837, 836; 296/37.8, 37.7; 307/130, 112, 43, 28, 4
  See application file for complete search history.

(56) References Cited

U.S. PATENT DOCUMENTS

| | | | | |
|---|---|---|---|---|
| 3,280,344 | A * | 10/1966 | Ville | 377/81 |
| 5,096,271 | A * | 3/1992 | Portman | 312/7.2 |
| 5,946,055 | A * | 8/1999 | Rosen | 348/837 |
| 6,115,086 | A * | 9/2000 | Rosen | 348/837 |
| 6,256,078 | B1 * | 7/2001 | Ogata | 349/58 |
| 6,292,236 | B1 * | 9/2001 | Rosen | 348/837 |
| 6,339,455 | B1 * | 1/2002 | Allan et al. | 348/837 |
| 6,416,027 | B1 * | 7/2002 | Hart | 248/324 |
| 6,424,386 | B1 * | 7/2002 | Shimizu | 348/837 |
| 6,476,879 | B1 * | 11/2002 | Ho et al. | 348/837 |
| 6,529,123 | B1 * | 3/2003 | Paul, Jr. | 340/425.5 |
| 6,633,347 | B2 * | 10/2003 | Kitazawa | 348/837 |
| 6,663,184 | B2 * | 12/2003 | Hagiike | 297/423.3 |
| 7,158,377 | B2 * | 1/2007 | Mecca et al. | 361/679.23 |
| 7,621,579 | B2 * | 11/2009 | Rosen | 296/37.8 |
| 7,821,163 | B2 * | 10/2010 | Kobayashi | 307/326 |
| 7,894,003 | B2 * | 2/2011 | Chang | 348/837 |

(Continued)

FOREIGN PATENT DOCUMENTS

| | | |
|---|---|---|
| JP | H5-097098 A | 4/1996 |
| JP | 2007-161041 A | 6/2007 |
| JP | 2008-013063 A | 1/2008 |

*Primary Examiner* — Justin Larson
*Assistant Examiner* — Lester L Vanterpool
(74) *Attorney, Agent, or Firm* — Shinjyu Global IP

(57) ABSTRACT

A rotary support apparatus is provided that includes a rotation mechanism, a support mechanism, an object detector and a controller. The rotation mechanism is configured to rotatably support a supported body between a first position and a second position. The support mechanism is configured to support the supported body with at least a two stage support force at the first position. The object detector is configured to detect a person or an object. The controller is configured to control the support mechanism so as to switch the support force based on the results detected by the object detector.

9 Claims, 3 Drawing Sheets

(56) References Cited

U.S. PATENT DOCUMENTS

| | | | |
|---|---|---|---|
| D636,749 S * | 4/2011 | Kucera | D14/132 |
| 8,059,215 B2 * | 11/2011 | Ikunami | 348/837 |
| 8,174,626 B2 * | 5/2012 | Ouchi | 348/745 |
| 8,308,237 B2 * | 11/2012 | Kunou | 297/217.3 |
| 8,469,884 B2 * | 6/2013 | David et al. | 600/301 |
| 8,500,194 B2 * | 8/2013 | Fischer et al. | 297/180.12 |
| 8,508,383 B2 * | 8/2013 | Peterson et al. | 340/815.4 |
| 8,654,433 B2 * | 2/2014 | Baur et al. | 359/267 |
| 8,665,382 B1 * | 3/2014 | Sugimoto et al. | 348/837 |
| 8,757,716 B2 * | 6/2014 | Ru et al. | 297/217.3 |
| 2003/0090133 A1 * | 5/2003 | Nathan et al. | 297/217.3 |

* cited by examiner

ROTARY SUPPORT APPARATUS

CROSS-REFERENCE TO RELATED APPLICATIONS

This application claims priority under 35 U.S.C. §119 to Japanese Patent Application No. 2011-135943, filed on Jun. 20, 2011 and Japanese Patent Application No. 2012-115075, filed on May 18, 2012. The entire disclosure of Japanese Patent Applications No. 2011-135943 and Japanese Patent Application No. 2012-115075 are hereby incorporated herein by reference.

BACKGROUND

1. Technical Field

The technology disclosed herein relates to a system for opening and closing a display device that is installed, for example, in an aircraft, a train, or any other movable vehicle and opens and closes between a storage position and a viewing position.

2. Background Information

In recent years, moving vehicles, and particularly aircraft, have been provided with display devices that are installed on the back side of passenger seat or above passenger seats, and that display movies or other such content and the current position or other such flight information.

A display device installed on the back side of passenger seat is an individual-use display device, whereas a display device installed above the passenger seats is a display device used by two or more passengers able to view the screen of the display device.

FIG. 1 is a simplified diagram of the typical layout of display devices in an aircraft. In FIG. 1, when not in use, a display device 420 of the type that is installed above passenger seats 410 is stored at a storage position 421 near a ceiling 440 in order to allow enough space above the passenger seats 410 for the safety of passengers 430. When in use, the device opens to its viewing position 422.

A liquid crystal display is commonly used for the above-mentioned display device. Because of the viewing angle characteristics of a liquid crystal display, the viewing position 422 must be maintained at an angle of at least 90 degrees from the storage position 421. A method in which a clutch, a brake, or another such support mechanism is installed at the driveshaft has been proposed in order to support the display device at the viewing position 422 even when it is subjected to vibration from the moving vehicle (see, for example, Japanese Laid-Open Patent Application 2007-161041).

Also, a method has been proposed in which a display device is closed to its storage position for the safety of passengers when a force over a threshold should be exerted due to collision by a person against the back side (that is, the opposite side from the screen) of the display device located in its viewing position (see, for example, Japanese Laid-Open Patent Application H5-097098).

Furthermore, a method has been proposed in which the display device is closed to its storage position in order to reduce the likelihood that a person will bump into the display device each time the proximity to an object is detected by a sensor (see, for example, Japanese Laid-Open Patent Application 2008-13063).

SUMMARY

However, with the method in Japanese Laid-Open Patent Application 2007-161041, only vibration from the moving vehicle itself is detected, and impact against the display device is not detected. Accordingly, even though normal operation can be maintained under vibration, there is nothing to reduce the likelihood that a person will bump into the display device.

Also, with the method in Japanese Laid-Open Patent Application H5-097098, if the threshold is lowered in order to take collision by a person into account, there is the risk that vibration from the moving vehicle will end up stowing away the display device. On the other hand, if the threshold is raised so that the device will not be stowed away just by vibration from the moving vehicle, the display device will end up not being stowed away even under a heavy impact caused by collision with a person.

Also, with the method in Japanese Laid-Open Patent Application 2008-13063, the display device is sometimes stowed away even when there is no risk of collision by a person, so it ends up being unnecessarily stowed away more often.

In view of this, one object of the technology disclosed herein is to provide a rotary support apparatus with which a display device can be held in its viewing position against vibration of a moving vehicle, and impact force on a person can be reduced when the person bumps into the device.

The rotary support apparatus disclosed herein includes a rotation mechanism, a support mechanism, an object detector and a controller. The rotation mechanism is configured to rotatably support a supported body between a first position and a second position. The supported body is provided on a movable vehicle. The support mechanism is configured to support the supported body with at least a two stage support force at the first position. The object detector is disposed near the supported body. The object detector is configured to detect a person or an object. The controller is configured to control the support mechanism so as to switch the support force based on the results detected by the object detector.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1. Configuration of Rotary Support Apparatus

Figure 1:
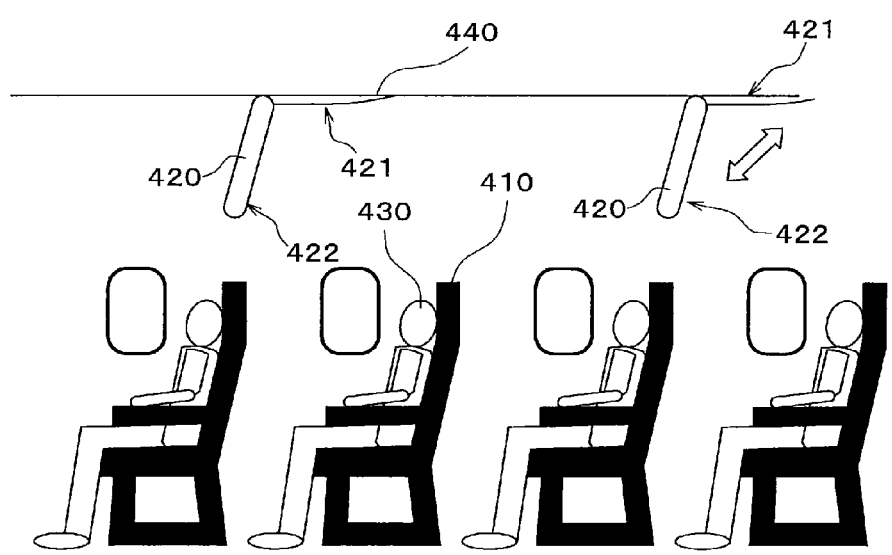
FIG. 1 is a simplified diagram of the layout of display devices in an aircraft.
Figure 2:
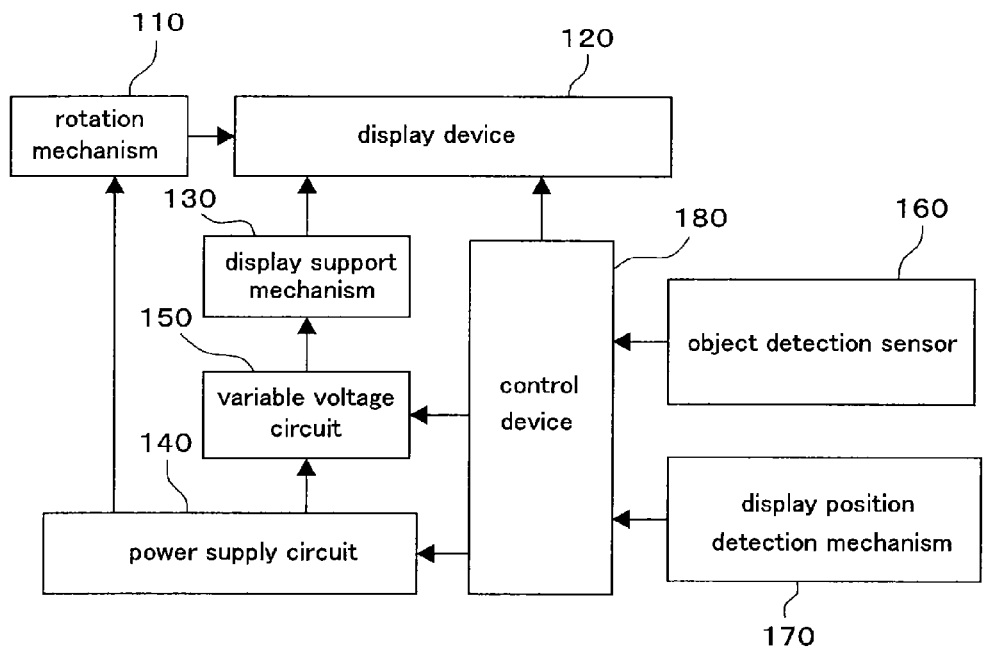
FIG. 2 is a block diagram of the configuration of a display device opening and closing system.
Figure 3:
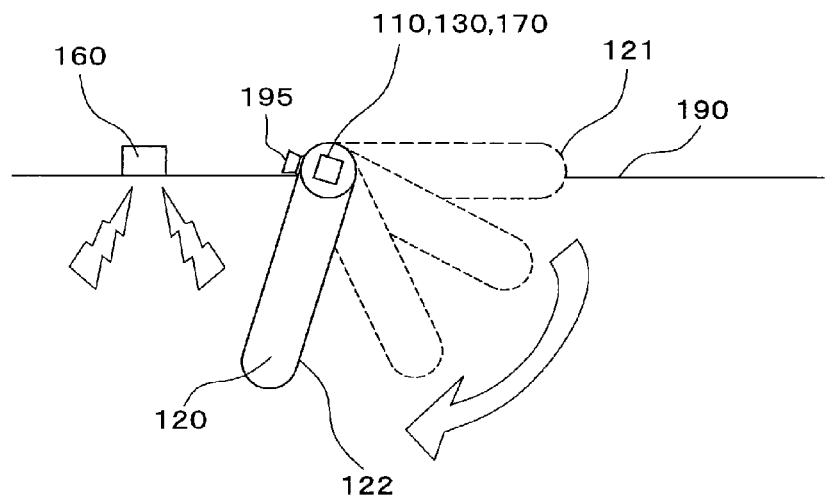
FIG. 3 is a side view illustrating the opening and closing of a display device opening and closing system.
Figure 4:
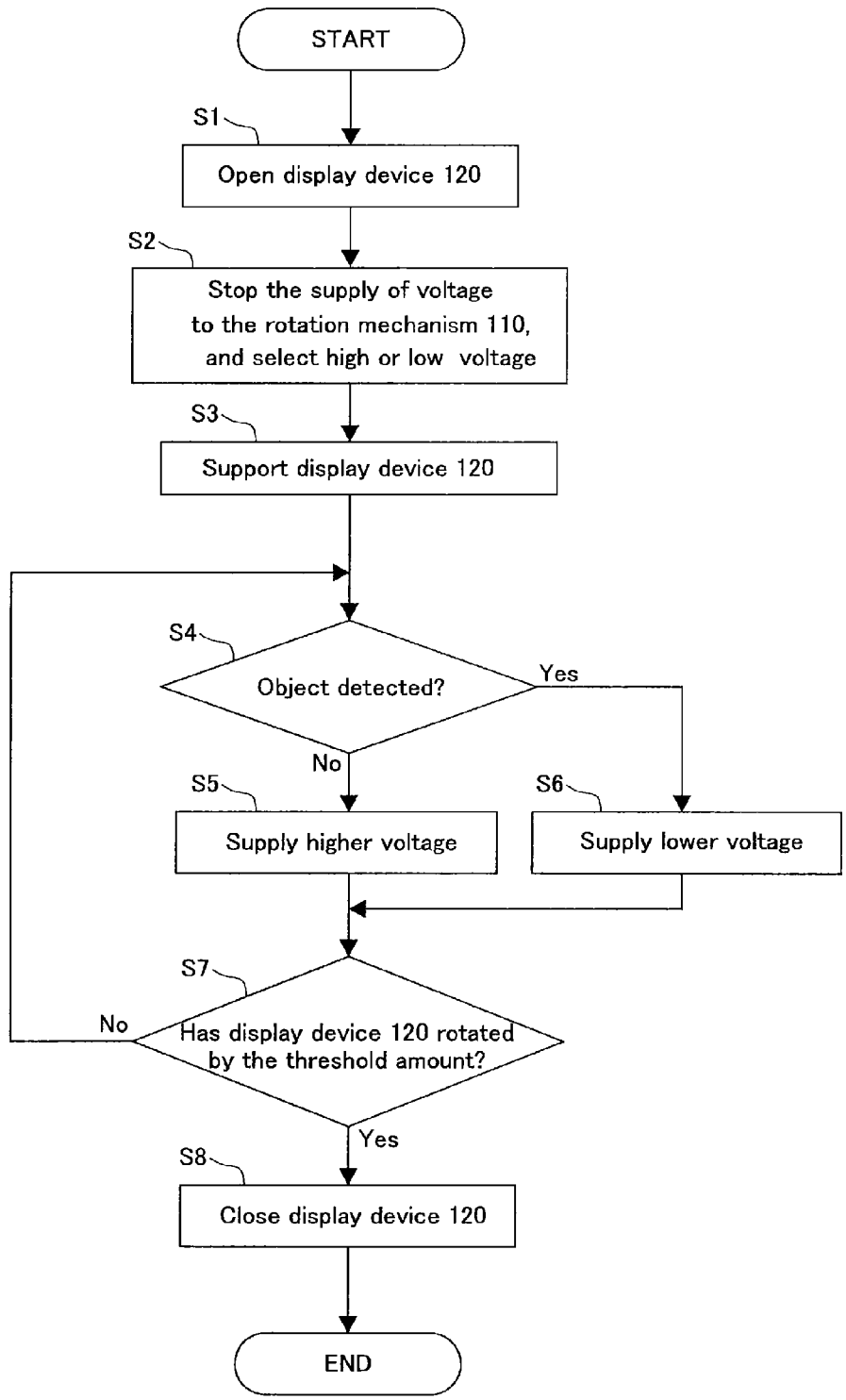
FIG. 4 is a flowchart of the operation of a display device opening and closing system.

FIG. 2 is a block diagram of the configuration of a display device opening and closing system to which the rotary support apparatus pertaining to an embodiment has been applied. FIG. 3 is a side view illustrating the opening and closing of a display device. FIG. 4 is a flowchart of the operation of a display device. The display device (one example of "a supported body") shown in FIG. 3 is installed above the passenger seats inside an aircraft (one example of "a moving vehicle") as with the display device shown in FIG. 1.

The supported body is not limited to being a display device, nor is the moving vehicle limited to being an aircraft.

In FIGS. 2 and 3, a rotation mechanism 110 performs an opening and closing (that is, rotating) of a display device 120. The rotation mechanism 110 is made up of a rotary shaft, a motor, and a spring. The rotary shaft is fixed to one end of the display device 120, and supports the display device 120. The motor imparts rotational force to the rotary shaft so that the display device 120 opens from its storage position 121 (one example of "a second position") to its viewing position 122 (one example of "a first position"). The spring imparts a biasing force to the rotary shaft so that the display device 120 closes from its viewing position 122 to its storage position 121. The rotational force of the motor is greater than the biasing force of the spring. The rotational force of the motor is stopped at the point when the display device 120 has rotated from its storage position 121 to its viewing position 122.

The storage position 121 is the position at which the display device 120 is closest to a ceiling 190, or the position at which the display device 120 is stowed inside the ceiling 190. The viewing position 122 is the position at which passengers can view the screen of the display device 120. The viewing position 122 may be at least 90 degrees away from the storage position 121 around the rotary shaft.

The display device 120 is rotated by the rotation mechanism 110 between the storage position 121 and the viewing position 122. When rotating by the rotation mechanism 110 from the storage position 121 to the viewing position 122, the display device 120 is supported by a display support mechanism 130. As shown in FIG. 3, rotation of the display device 120 beyond the viewing position 122 is restricted by a blocking portion 195 provided to the ceiling 190.

The display support mechanism 130 (one example of "a support mechanism") supports the display device 120 at the viewing position 122. A one-way clutch, a powder clutch, or the like can be used as the display support mechanism 130. The display support mechanism 130 can support the display device 120 with two stages (stronger and weaker) of support force according the voltage supplied from a power supply circuit 140. The stronger support force should be enough to hold the display device 120 so that it does not leave the viewing position 122 under vibration from the aircraft. This stronger support force can be set as dictated by the size and weight of the display device 120, the amount of vibration from the aircraft, and so forth. Meanwhile, the weaker support force should be low enough that there will be little impact force on a person if the person should bump into the display device 120.

The power supply circuit 140 is the power supply for the display device 120. A variable voltage circuit 150 can switch the voltage supplied from the power supply circuit 140 to the display support mechanism 130 between at least two stages (higher and lower). The higher voltage is used to generate the stronger support force in the display support mechanism 130, while the lower voltage is used to generate the weaker support force in the display support mechanism 130.

An object detection sensor 160 (an example of an object detector) is attached near the display device 120 on the ceiling 190. The object detection sensor 160 uses infrared rays to detect that an object has moved closer from the rear side of the display device 120 (that is, the back side of the screen). Upon detecting an object, the object detection sensor 160 notifies a control device 180 to that effect.

The object detection sensor 160 is not limited to infrared ray sensor, and may be a temperature sensor that detects a person's body temperature, or an image-identifying machine using a camera, for example.

The place where the object detection sensor 160 is attached may be near the display device 120 and where proximity to a person can be detected, such as on a seat.

A display position detection mechanism 170 (an example of a position detection mechanism) is attached to the display device 120, and detects the opening and closing positions of the display device 120. More specifically, when the display device 120 reaches the viewing position 122, the display position detection mechanism 170 notifies the control device 180 to that effect. Also, when the display device 120 has rotated from the viewing position 122 toward the storage position 121 by at least a specific amount, the display position detection mechanism 170 notifies the control device 180 to that effect.

The control device 180 (one example of "a controller") controls the supply of power to the rotation mechanism 110 and the display support mechanism 130, and sends video to the display device 120. When the control device 180 sends video to the display device 120, the control device 180 opens the display device 120 from its storage position 121 toward its viewing position 122 by supplying power from the power supply circuit 140 to the rotation mechanism 110. Upon acquiring from the display position detection mechanism 170 a notification to the effect that the display device 120 has reached the viewing position 122, the control device 180 stops the supply of power from the power supply circuit 140 to the rotation mechanism 110, and supplies power from the power supply circuit 140 to the display support mechanism 130. Upon acquiring from the object detection sensor 160 a notification to the effect that an object has been detected, the control device 180 controls the variable voltage circuit 150 so as to supply the lower voltage to the display support mechanism 130. On the other hand, as long as no notification is acquired from the object detection sensor 160 to the effect that an object has been detected, the control device 180 controls the variable voltage circuit 150 so as to supply the higher voltage to the display support mechanism 130. Also, upon acquiring from the display position detection mechanism 170 a notification to the effect that the display device 120 has rotated from the viewing position 122 toward the storage position 121 by at least a specific amount, the control device 180 stops the supply of power to the display support mechanism 130 and closes the display device 120 under the biasing force of the spring.

The display support mechanism 130 exerts support force in the closing direction of the display device 120, but does not exert any support force in the opening direction.

2. Operation of Rotary Support Apparatus

The operation of the rotary support apparatus will be described through reference to the flowchart in FIG. 4.

When video is started on the display device 120 for the passengers, a command to supply voltage to the rotation mechanism 110 is outputted from the control device 180 to the power supply circuit 140. Consequently, the display device 120 stowed in the storage position 121 opens up (S1).

When the display position detection mechanism 170 detects that the display device 120 has reached the viewing position 122, a command to stop the supply of voltage to the rotation mechanism 110 is outputted from the control device 180 to the power supply circuit 140. Consequently, the supply of voltage from the power supply circuit 140 to the rotation mechanism 110 is cut off. At this point, the control device 180 reads the output of the object detection sensor 160 attached to the ceiling 190 to which the display device 120 is fixed, and the control device 180 selects the voltage value corresponding to the output of the object detection sensor 160 (S2). The control device 180 outputs a command to the variable voltage circuit 150 so that the selected voltage value will be supplied. Consequently, the variable voltage circuit 150 outputs the supplied voltage to the display support mechanism 130, and the display support mechanism 130 supports the display device 120 at the viewing position 122 at a support force based on the supplied voltage (S3).

Next, video is provided to the passengers. After this, the control device 180 reads the output of the object detection sensor 160 and determines whether or not the object detection sensor 160 has detected an object near the display device 120 (S4). If no obstruction is detected (No in S4), the control device 180 outputs to the variable voltage circuit 150 a command to supply the higher voltage to the display support mechanism 130 in order to support the display device 120 at the viewing position 122 (S5).

At the command from the control device 180, the higher voltage is supplied from the variable voltage circuit 150 to the display support mechanism 130, and the stronger support force is generated at the display support mechanism 130. That is, between the two stages of support forces, the stronger support force stage is selected.

On the other hand, if an obstruction is detected near the display device 120 (Yes in S4), the control device 180 outputs to the variable voltage circuit 150 a command to supply the lower voltage to the display support mechanism 130 in order to cushion the impact if the object hits the display device 120 (S6).

At a command from the control device 180, the lower voltage is supplied from the variable voltage circuit 150 to the display support mechanism 130, and the weaker support force is generated at the display support mechanism 130. That is, between the two stages of support forces, a switch is made to the lower support force stage.

The control device 180 then determines whether or not the display device 120 has been rotated by at least a specific amount on the basis of the output of the display position detection mechanism 170 attached to the display device 120 (S7). If it has been rotated by at least the specific amount (Yes in S7), the control device 180 decides that a person or object has bumped into the display device 120, and outputs a command to the power supply circuit 140 to stop the supply of voltage to the display support mechanism 130. Consequently, the supply of voltage from the power supply circuit 140 to the display support mechanism 130 is cut off, and the display device 120 is closed to its storage position 121 by the biasing force of the spring of the rotation mechanism 110 (S 8).

On the other hand, if it has not been rotated by at least the specific amount (No in S7), a command is outputted to the power supply circuit 140 to continue supplying voltage to the display support mechanism 130. Consequently, the supply of power from the power supply circuit 140 to the display support mechanism 130 is maintained, and the voltage selected in S5 or S6 is supplied to the display support mechanism 130.

However, the display device 120 does not necessarily have to be closed to its storage position 121. Even if the display device 120 is put back in its viewing position 122 after the open and closed positions of the display device 120 have moved during impact, injury can be reduced because of the lower support force of the display device 120.

3. Action and Effects

As discussed above, in the embodiment of the present invention, the rotary support apparatus comprises the display support mechanism 130 that supports the display device 120 at the viewing position 122, the object detection sensor 160 that is attached near the display device 120, the display position detection mechanism 170 that is fixed to the display device 120, the control device 180 that determines the state of the display device 120 based on the output of the object detection sensor 160 and the output of the display position detection mechanism 170, and the variable voltage circuit 150 that can vary the support force of the display support mechanism 130 according to the determination result of the control device 180.

Therefore, by detecting a person or object near the display device 120, the support force of the display device 120 can be lowered so that the display device 120 will be securely supported under vibration from the moving vehicle if no object is detected, and there will be no problem if the object bumps into the display device if an object is detected.

For example, when there is a large amount of vibration from the moving vehicle, the passengers usually do not get out of their seats very often, and pay closer attention to their surroundings. Therefore, there is less risk of accidentally bumping into the open display device, and there is no particular problem with increasing the support force of the display device.

On the other hand, when there is little vibration from the moving vehicle, the passengers get up from the seats more often and are more careless. Therefore, there is a greater likelihood of bumping into an open display device, but injury caused by collision can be reduced by reducing the support force of the display device. Also, the display device will be less susceptible to damage.

Furthermore, when the display device 120 has been rotated by more than the specific amount due to a force exerted from the rear on the display device 120, the display device can be closed to its storage position for the sake of safety.

Other Embodiments (A) In the above embodiment, the support force at the viewing position of the display device was switched in two stages, but the number of stages may be increased. In this case, the support force can be controlled more precisely, such as decreasing it in stages as a passenger moves closer to the display. More specifically, the object detection sensor 160 detects the distance between the object and the display device 120, and the control device 180 outputs a command to the variable voltage circuit 150 to supply lower voltage as the distance decreases.

(B) Although not particularly touched upon in the above embodiment, the rotation mechanism 110 may have an arm that links the rotary shaft with the display device 120. In this case, the open and closed positions of the display device 120 can be fine-tuned by changing the shape or length of the arm.

(C) In the above embodiment, the object detection sensor 160 could be attached anywhere near the display device 120, but this is not the only option. The object detection sensor 160 may instead be attached to the display device 120 itself. In this case, the object detection sensor 160 can accurately detect the distance between the object and the display device 120.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a rotary support apparatus. Accordingly, these terms, as utilized to describe the present invention should be interpreted relative to a rotary support apparatus.

The term "configured" as used herein to describe a component, section or part of a device or apparatus includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rotary support apparatus comprising:
    a rotation mechanism configured to rotatably support a supported body between a first position and a second position, the supported body being provided on a movable vehicle;
    a support mechanism configured to support the supported body with at least a two stage support force at the first position;
    an object detector disposed near the supported body, the object detector being configured to detect a person or an object; and
    a controller configured to control the support mechanism so as to switch the support force based on the results detected by the object detector.

2. The rotary support apparatus according to claim 1, wherein
    when the object detector detects a person or an object, the controller controls the support mechanism so as to support the supported body at a lower support force of the at least two stage support force.

3. The rotary support apparatus according to claim 1, wherein
    when the object detector does not detect a person or an object, the controller controls the support mechanism so as to support the supported body at a higher support force of the at least two stage support force.

4. The rotary support apparatus according to claim 1, wherein
    the object detector is configured to detect the distance between the supported body and the person or the object, and
    the controller is configured to control the support mechanism so that the support force decreases in proportion to the detected distance.

5. The rotary support apparatus according to claim 1, further comprising:
    a variable voltage circuit configured to vary the amount of voltage supplied to the support mechanism, wherein
    the support mechanism is configured to switch the support force based on the supplied voltage, and
    the variable voltage circuit is configured to vary the amount of voltage supplied to the support mechanism based on the results detected by the object detector.

6. The rotary support apparatus according to claim 1, wherein
    the rotation mechanism rotates the supported body from the second position to the first position when power is being supplied and toward the second position when no power is being supplied.

7. The rotary support apparatus according to claim 1, wherein
    the supported body is a display device disposed on the ceiling of the movable vehicle.

8. The rotary support apparatus according to claim 1, further comprising:
    a position detection mechanism configured to detect the position of the supported body, wherein
    the rotation mechanism rotates the supported body toward the second position when the position detection mechanism has detected that the supported body has been rotated from the first position by at least a specific amount.

9. A rotary support apparatus on a movable vehicle comprising:
    a supported body rotably movable between a first position and a second position;
    a rotation mechanism configured to rotatably support the supported body between the first position and the second position;
    a biasing member configured to exert a biasing force upon the supported body, the biasing force urging the supported body towards the second position;
    a support mechanism configured to support the supported body against the biasing force at the first position, the support mechanism producing at least a two stage support force;
    the two stage support force including a first support force and a second support force;
    an object detector disposed near the supported body, the object detector being configured to detect a person or an object; and
    a controller configured to:
        determine which support force to exert based upon the results detected by the object detector, and
        control the support mechanism to switch from the first support force to the second support force based on the determination.

\* \* \* \* \*